United States Patent

Barbou des Courières et al.

[19]

[11] Patent Number: 4,769,129

[45] Date of Patent: Sep. 6, 1988

[54] METHOD FOR HYDROPROCESSING HYDROCARBON-BASED CHARGES

[75] Inventors: Thierry J. Barbou des Courières, Lyon; Michèle J. Breysse, Caluire; Michel L. Lairoix, Lyon; Michel L. Vrinat, Caluire, all of France

[73] Assignee: Elf France, Courbevoie, France

[21] Appl. No.: 921,004

[22] Filed: Oct. 17, 1986

[30] Foreign Application Priority Data

Oct. 18, 1985 [FR] France ................. 85 15517

[51] Int. Cl.$^4$ ................. C10G 45/04
[52] U.S. Cl. ................. 208/215; 208/251 H; 208/254 H; 208/213
[58] Field of Search ............. 208/254 H, 215, 251 H

[56] References Cited

U.S. PATENT DOCUMENTS

| | | | |
|---|---|---|---|
| 2,946,738 | 7/1960 | Gardner et al. | 208/215 |
| 3,161,584 | 12/1964 | Gleim | 208/254 H |
| 3,161,585 | 12/1964 | Gleim et al. | 208/251 H |
| 3,180,820 | 4/1965 | Gleim et al. | 208/251 H |
| 3,252,895 | 5/1966 | Gleim et al. | 208/254 H |
| 3,282,828 | 11/1966 | Gleim | 208/251 H |
| 3,617,503 | 11/1971 | Rogers | 208/251 H |
| 3,619,410 | 11/1971 | Gleim | 208/215 |
| 3,622,495 | 11/1971 | Geatsis | 208/251 H |
| 3,622,497 | 11/1971 | Gleim | 208/251 H |
| 3,622,498 | 11/1971 | Slolfu et al. | 208/215 |
| 3,622,503 | 11/1971 | Hausler | 208/215 |
| 3,657,111 | 4/1972 | Gleim | 208/215 |
| 3,694,352 | 9/1972 | Gleim | 208/215 |
| 3,948,763 | 4/1976 | Christman et al. | 208/254 H |
| 4,139,453 | 2/1979 | Hutchings | 208/254 H |
| 4,177,136 | 12/1979 | Herrington et al. | 208/215 |
| 4,194,967 | 3/1980 | Gatsis | 208/215 |
| 4,197,191 | 4/1980 | Gatsis | 208/215 |
| 4,199,439 | 4/1980 | Gatsis | 208/251 H |
| 4,424,142 | 1/1984 | Asauka et al. | 208/251 H |
| 4,438,218 | 3/1984 | Boorman et al. | 208/215 |

FOREIGN PATENT DOCUMENTS

| | | | |
|---|---|---|---|
| 110985 | 7/1981 | Pakistan | 208/251 H |
| 1327635 | 8/1973 | United Kingdom | 208/215 |

*Primary Examiner*—Asok Pal
*Assistant Examiner*—Helane Myers
*Attorney, Agent, or Firm*—Burgess, Ryan and Wayne

[57] ABSTRACT

This invention relates to a method of hydrotreating hydrocarbon-based charges by using a catalyst that comprises $V_2S_3$ prepared in situ in the reaction zone or $V_2S_3$ prepared outside this zone but treated in this zone by a sulphurating agent. The hydrotreating method according to the invention can be used to treat hydrocarbon-based charges such as gasoline, gasoil, refinery residues and heavy crude oils, thus allowing the elimination of impurities such as nitrogen, sulphur and metals. The method can also be used to hydrogenize the olefins and the aromatics and possibly lead to rupture of the carbon-carbon bonds.

5 Claims, No Drawings

METHOD FOR HYDROPROCESSING HYDROCARBON-BASED CHARGES

BACKGROUND OF THE INVENTION

Field of the Invention

The present invention relates to a method for hydrotreating hydrocarbon-based charges.

The ready availability of large quantities of hydrogen in refining plants and the increasing demand for improved quality products have led to a considerable development in hydrotreating methods.

Depending upon the operating parameters, hydrotreating eliminates impurities such as nitrogen, sulphur and metals, to hydrogenizes olefins, diolefins and even aromatics or even leads to the rupture of the carbon-carbon links in the hydrocracking reactions.

The operating parameters that determine the degree of cracking severity of the hydrotreating are in particular the hydrogen pressure, the temperature and the duration of the reaction.

The catalysts currently utilized in the hydrotreating are selected from among the hydrogenation catalysts. The hydrogenation catalysts suitable for use in the hydrogenation are those which are not poisoned by sulphur and nitrogen of the hydrocarbon-based charges. Thus, a hydrogenation catalyst as effective as palladium cannot be used in the hydrotreating treatment since it is over-sensitive to the presence of sulphur.

The catalysts most widely used in hydrotreating are cobalt, nickel, molybdenum or tungsten sulphides or their mixtures, generally on an alumina support (DONATI Advances in Catalysis and Related Subjects 8, 39—Academic Press New York—1956).

Due to the increasing use of low quality crudes, containing large quantities of sulphur, nitrogen, metals and asphaltenes, the need has arisen to develop increasingly active hydrotreating catalysts.

In one study, performed with the specific aim of developing novel hydrotreating catalysts, T. A. PECORARO et al. (Journal of Catalysis 67, 430–445, 1981) have examined the activity of a large number of metallic sulphides as hydrosulphuration catalysts. They have observed that the sulphides of the metals belonging to Group VB of the Periodic Table of Elements (vanadium, niobium, tantalum) have a catalytic activity much lower than the sulphides of metals belonging to Group VI (molybdenum, chromium, tungsten). In particular, they found that unsupported vanadium sulphide has no desulphurating activity with respect to dibenzothiophene.

This conclusion has been corroborated by the results obtained by L. A. RANKEL et al. (Fuel 62, 44, January 1983) who compare the reactivity of the classical cobalt-molybedenum catalysts with that of vanadium sulphide. By studying the same reaction as the previous authors, the desulphurization of the dibenzothiophene, they have determined that the activity of the vanadium sulphide is one fifth that of the cobalt-molybdenum sulphides catalyst.

It has now been found that vanadium sesquisulphide ($V_2S_3$) prepared in situ in the reaction zone or $V_2S_3$ prepared outside the reaction zone and processed in this zone by a sulphurating agent presents a high catalytic activity in the hydrotreating reactions of the hydrocarbon-based charges.

All the reactions leading to the formation of $V_2S_3$ are suitable for use in this method. It can involve thermic reactions, $V_2S_3$ being obtained through thermic decomposition of a vanadium compound.

Thus, ammonium thiovanadate $(NH_4)_3VS_4$, can be introduced into the reactor in the form of an aqueous solution. $V_2S_3$ is formed through heating this solution at a temperature comprised between 200° and 500° C. $V_2S_3$ is obtained in theform of small particles that can be utilized immediately as a catalyst.

It is also possible to impregnate alumina with an ammonium thiovanadate solution and thereafter subject it to the thermic treatment. The $V_2S_3$ is formed on the alumina support or on any other porous support.

The $V_2S_3$ can also be prepared through hydrogen sulphide reaction with a vanadium compound. Vanadyl sulphate, $VOSO_4$, is transformed into $V_2S_3$, through treating with hydrogen sulphide at a temperature comprised between 250° and 400° C. for at least 30 minutes.

If $V_2S_3$ is utilized, formed outside the reaction zone and which has been in contact with air or water vapor, it must be reactivated in the reaction zone by a sulphurating agent. Hydrogen sulphide at a temperature comprised between 250° and 400° C. during at least 30 minutes is generally used.

The $V_2S_3$ can be utilized by a hydrotreating catalyst, in its unsupported form or deposited on a porous support such as alumina, silica, magnesia and the clays used either in the pure or mixed form.

The $V_2S_3$ can be associated to other catalysts, such as the sulphides belonging to Groups VI B and VIII.

The hydrotreating method according to the invention applies to hydrocarbon-based charges such as gasoline, gasoil, refinery residues as reduced crude or vacuum residues and to heavy crude oil.

The hydrotreating of the gasolines allows one to reduce their sulphur and nitrogen contents as well as to hydrogenize the olefins and diolefins present in these cuts.

With respect to the gasoils or the vacuum distillates, a moderated hydrotreating eliminates more particularly the sulphur, while a high severity hydrotreating leads to hydrocracking with formation of lighter molecules.

In the case of reduced crudes, vacuum residues and heavy crude oils, a low severity hydrotreating eliminates the sulphur and the metals and reduces the asphaltene content. A high severity hydrotreating leads to hydrocracking.

The hydrotreating of the hydrocarbon-based charges according to the present invention is performed at a temperature comprises between 250° and 450° C., a hydrogen/hydrocarbon molar ratio comprises between 100 and 1500 Nl/l, a total pressure comprised between 20 and 200 bars and a liquid hourly space velocity comprised between 0.1 and 10 l/h.

The following examples illustrate the invention, without however limiting the same.

EXAMPLE 1

Thiovanadate of ammonium $(NH_4)_3VS_4$ is prepared in aqueous solution by reaction of $(NH_4)_2S$ on pyrovanadate $Na_4V_2O_7$ in the presence of $H_2S$. the thiosalt $(NH_4)_3VS_4$ is thereafter thermically decomposed by raising the temperature at the velocity of 12° C./min., at atmospheric pressure, in the presence of hydrogen containing 15 volume of hydrogen sulphide. At 400° C. a plateau temperature of 4 hours is maintained.

The unsupported $V_2S_3$ obtened is tested as a hydrogenation catalyst of biphenyl, under the following operating conditions:

| | |
|---|---|
| temperature | 260° C. |
| pressure | 2.35 10⁶ Pa |
| partial pressure of biphenyl | 800 Pa |
| partial pressure of $H_2S$ | 440 Pa |

The catalytic activity of the $V_2S_3$ formed in situ in the reactor is compared with the activity of a commercially available $V_2S_3$ manufactured by the company VENTRON, to the same commercially available $V_2S_3$ having been subjected to a previous sulphuration and to other metallic sulphides having the same initial surface area of 20 m²/g and utilized under the same conditions. The results have been compiled in the table below.

TABLE 1

| | Activity $10^{-18}$ moles s$^{-1}$ g |
|---|---|
| unsupported $V_2S_3$ | 8.4 |
| commercial $V_2S_3$ | 1.0 |
| commercial sulphurated $V_2S_3$ | 1.3 |
| $MoS_2$ | 1.9 |
| $Co_9S_8$ | 0.8 |
| NiS | 0.7 |

The activity is measured at the stationary state after 15 hours of reaction in differential dynamic microreactor in vapor phase and compared with the activity of other unsupported metallic sulphides with specific isosurface. It is evident, that with equal initial surface areas, the $V_2S_3$ formed in situ in the reactor presents a hydrogenating activity significantly higher than that of the metal sulphides generally utilized as hydrotreating catalysts.

EXAMPLE 2

The unsupported $V_2S_3$ is obtained according to the same operating conditions as those of example 1.

Its catalystic activity was tested in desulphuration reaction of the dibenzothiophene at a temperature of 260° C., under a total pressure of $10^5$ Pa and a partial pressure of dibenzothiophene of 68 Pa. The activity is compared with the molybdenum sulphide used in the same conditions. The results have been compiled in Table 2.

TABLE 2

| | Initial surface m²/g | Activity $10^{-8}$ moles s$^{-1}$g$^{-1}$ |
|---|---|---|
| $V_2S_3$ | 20 | 0.35 |
| $MoS_2$ | 55 | 0.25 |

Although its initial surface area is almost three times smaller, the vanadium sulphide has a higher activity.

EXAMPLE 3

An alumina of a type similar to those utilized for hydrotreating catalysts of petroleum cuts is impregnated with ammonium thiovanadate. The thermal decomposition occurs under the same operating conditions as those referred to in example 1. $V_2S_3$ deposited on alumina is obtained. The quantity deposited corresponds to 10% by weight of metallic vanadium.

The catalytic activity is characterized by the hydrogenation reaction of biphenyl under the same operating conditions as those referred to in example 1. Its activity is compared with that of a molybdenum sulphide and a commercially available Co-Mo catalyst, utilized for desulphurizing gasoils.

In Table 3 the results have been compared with these three catalysts. The catalysts are characterized by the quantity of metal deposited on the alumina.

TABLE 3

| Catalyst | Activity $10^{-8}$ moles s$^{-1}$g$^{-1}$ |
|---|---|
| 10% V on alumina | 5.7 |
| 11.2% Mo on alumina | 1.2 |
| 9% Mo + 2.2 Co on alumina (commercial catalyst). | 1.8 |

EXAMPLE 4

The same alumina as that used in the previous example is impregnated with vanadyl sulphate. The vanadyl sulphate has been decomposed at atmospheric pressure under a $H_2$—$H_2S$ mixture at 15% $H_2S$ through a rise in temperature of 12° C./min. up to 400° C. then a plateau of 4 hours at 400° C. The quantity of deposited vanadium corresponds to 10% by weight of metallic vanadium.

The catalytic activity is characterized by the hydrogenation reaction of biphenyl under the same operating conditions as those referred to in exmaple 1 and comparted to that of $V_2S_3$ obtained by thermal decomposition of $(NH_4)_3VS_4$ described in example 3.

| Catalyst | Activity $10^{-8}$ moles s$^{-1}$g$^{-1}$ |
|---|---|
| 10% V on alumina ex $VOSO_4$ | 4.0 |
| 10% V on alumina ex $(NH_4)_3VS_4$ | 5.7 |

Although the activity is lower the utilization of $VOSO_4$ can be advantageous since the product is relatively inexpensive.

EXAMPLE 5

The catalytic activity of unsupported $V_2S_3$ as hydrotreating catalyst is compared to that of a commercially available hydrotreating catalyst.

The charge is a vacuum residue of Arabian light deasphalted by butane and its characteristics are compiled in Table 4.

TABLE 4

| | |
|---|---|
| $d_4^{15}$ | 0.948 |
| $V_{100° C.}$ | 60 cSt |
| S | 3.0% |
| N | 1250 ppm |
| Conradson carbon | 5.6 |
| Ni + V | <5 ppm |

Operating conditions of the hydrotreating:

| | |
|---|---|
| $P_{H2}$ | 85 bars (8.5 10⁶ Pa) |
| T | 385° C. |
| VVH | 1 |

The results have been compiled in table 5.

TABLE 5

| | HDS % | HDN % | HDCC % |
|---|---|---|---|
| commercial catalyst. (9% Mo + 2.2% Co on alumina) | 95 | 41 | 78 |

TABLE 5-continued

| | HDS % | HDN % | HDCC % |
|---|---|---|---|
| catalyst at 10% of unsupported $V_2S_3$ | 97 | 52 | 85 |

HDS = hydrodesulphuration
HDN = hydrodenitration
HDCC = reduction of the Conradson carbon content.

We claim:

1. In a catalytic hydrotreating method for the treatment of hydrocarbon-based charges, the improvement which comprises hydrotreating said hydrocarbon-based charges in the presence of a $V_2S_3$ catalyst prepared in situ by the decomposition of ammonium thiovanadate, $(NH_4)_3-VS_4$.

2. Method according to claim 1, wherein said ammonium thiovanadate is decomposed by heating at a temperature comprised between 200° and 500° C.

3. Method according to claim 1, wherein the hydrocarbon-based charge is selected from the group consisting of gasoline, gasoil, the refinery residues and the heavy crude oils.

4. Method according to claim 1, wherein the refining residue is reduced crude or a vacuum residue.

5. Method according to claim 1, wherein it is performed at a temperature comprised between 250° and 450° C., with a hydrogen/hydrocarbon molar ratio comprised between 100 and 1500 Nl/l, a pressure of 20 to 200 bars, a liquid hourly space velocity comprised between 0.1 and 10 l/h consisting in the desulphuration, denitration, demetallation, hydrogenation and hydrocracking of the hydrocarbon-based charges.

* * * * *

UNITED STATES PATENT AND TRADEMARK OFFICE
CERTIFICATE OF CORRECTION

PATENT NO. : 4,769,129
DATED : September 6, 1988
INVENTOR(S) : Barbou des Courieres et al.

It is certified that error appears in the above-identified patent and that said Letters Patent is hereby corrected as shown below: Item [75]

Title Page: "Michel L. Lairoix" should be "Michel L. Lacroix--

Signed and Sealed this

Thirteenth Day of June, 1989

Attest:

DONALD J. QUIGG

Attesting Officer

Commissioner of Patents and Trademarks